C. H. CHALMERS.
TRACTOR.
APPLICATION FILED AUG. 19, 1916.

1,312,159.

Patented Aug. 5, 1919.
3 SHEETS—SHEET 3.

WITNESSES

INVENTOR
CHARLES H. CHALMERS
BY
ATTORNEYS

UNITED STATES PATENT OFFICE.

CHARLES H. CHALMERS, OF MINNEAPOLIS, MINNESOTA, ASSIGNOR TO F. E. HOLTON, CHARLES M. ANDRIST, JOHN M. SIEBERG, AND CHARLES H. CHALMERS, TRUSTEES, ALL OF MINNEAPOLIS, MINNESOTA.

TRACTOR.

1,312,159.  Specification of Letters Patent.  Patented Aug. 5, 1919.

Application filed August 19, 1916. Serial No. 115,831.

*To all whom it may concern:*

Be it known that I, CHARLES H. CHALMERS, a citizen of the United States, and resident of Minneapolis, in the county of Hennepin and State of Minnesota, have invented certain new and useful Improvements in Tractors, of which the following is a specification.

This invention relates to improvements in tractors, and the object of the invention is to provide a tractor driven by a suitable engine or motor and having means for attaching a team of horses or other animals thereto, for the purpose of guiding the tractor and furnishing extra power that may be used for a short time when there is an overload upon the machine, which the tractor engine or motor would not be able to handle. By this arrangement I am able to produce a tractor in which the motive for ordinary operations will be supplied from a suitable motor, preferably an ordinary internal combustion engine, while the team guides the tractor and furnishes the power for taking care of the overload. In this way I provide a tractor having two sources of power, one adapted to a steady load, with little or no overload capacity, and the other capable of great overload temporarily. I also provide means by which the tractor may be moved by animal power, thereby causing the rotation of the motor crank shaft, the reciprocating of the motor pistons, and, in this way, the starting of the engine or motor itself, thereby saving the usual cranking of the motor.

The invention consists generally in the constructions and combinations hereinafter described and particularly pointed out in the claims.

Figure 1:
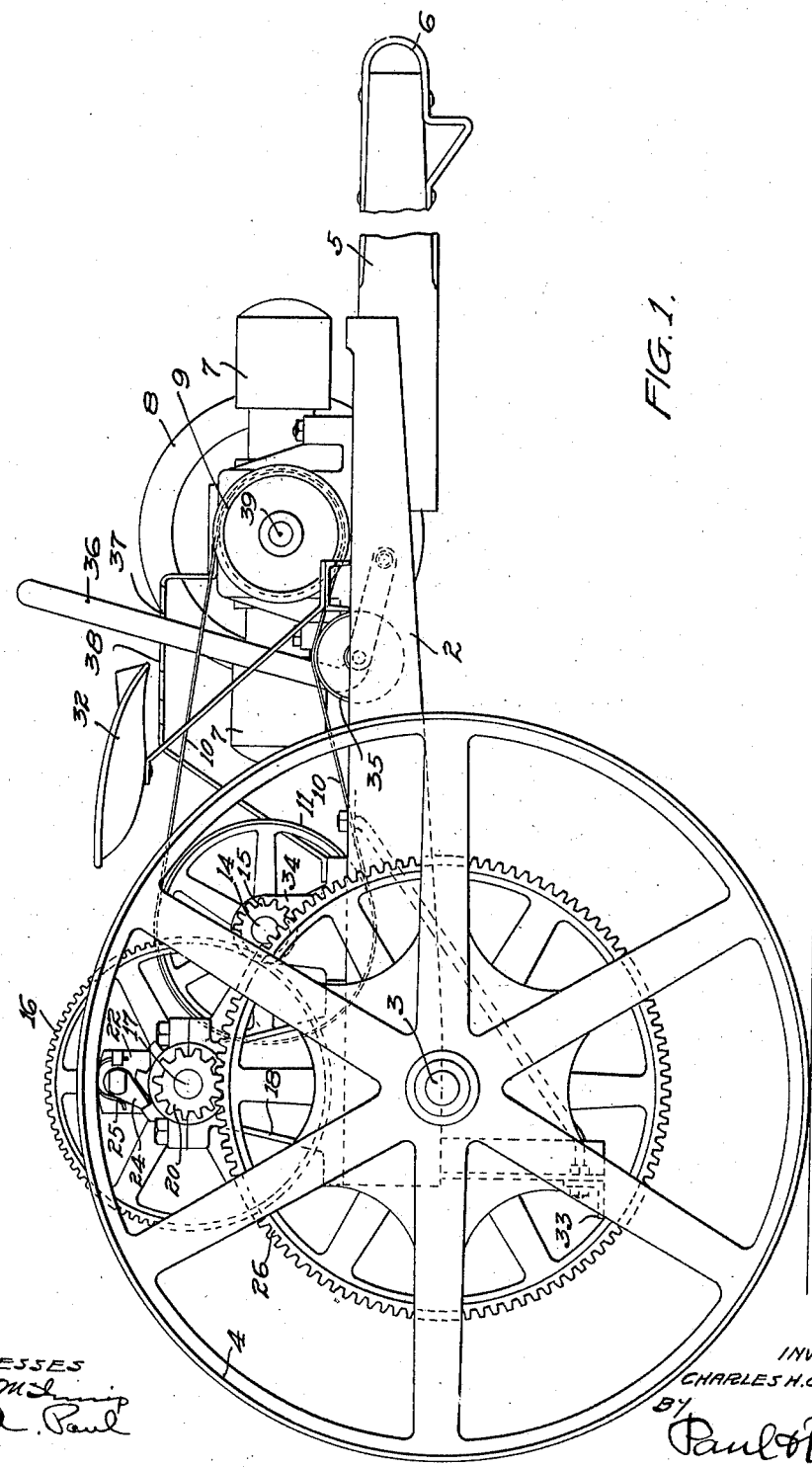
Figure 2:
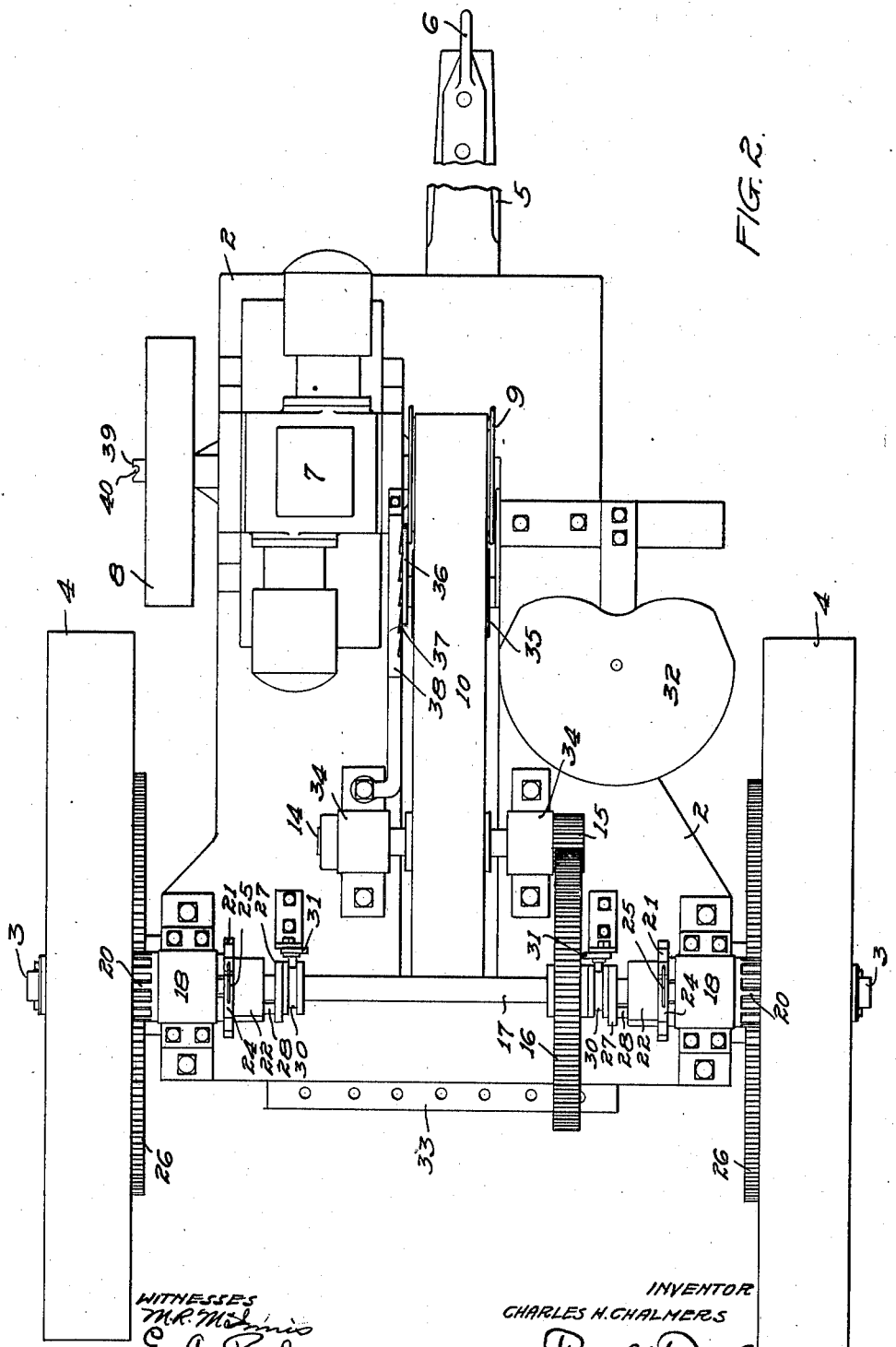
Figure 3:
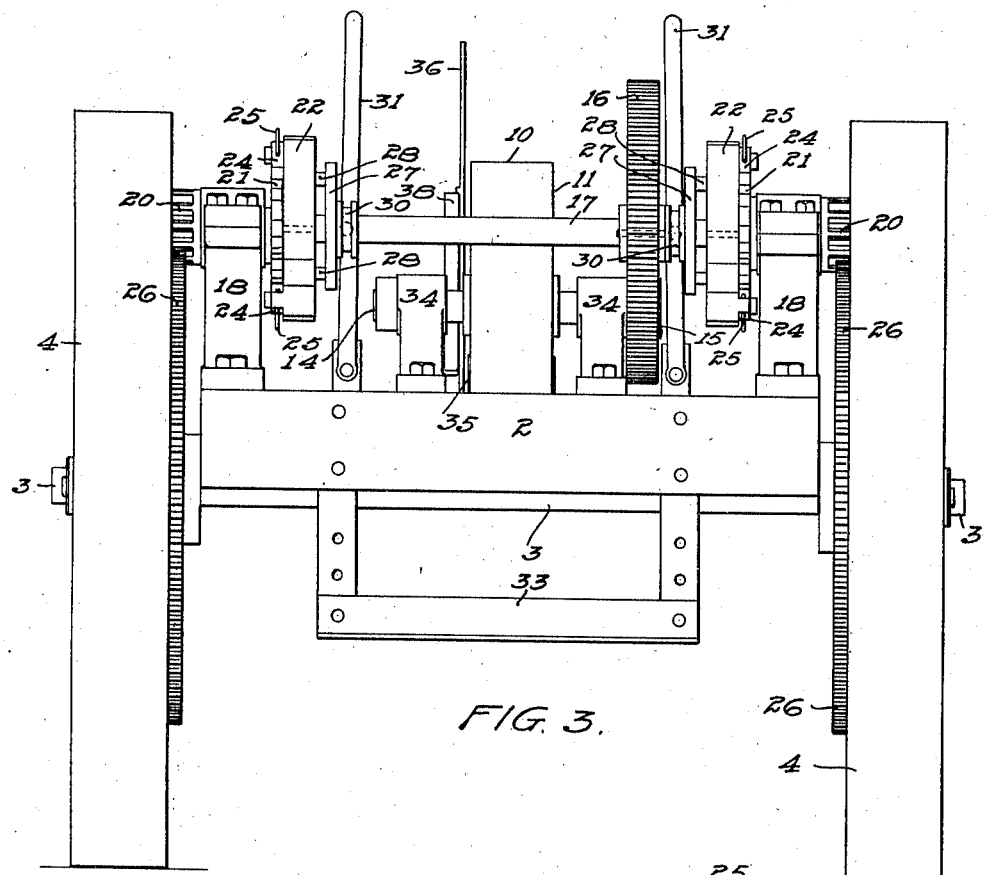
Figure 4:
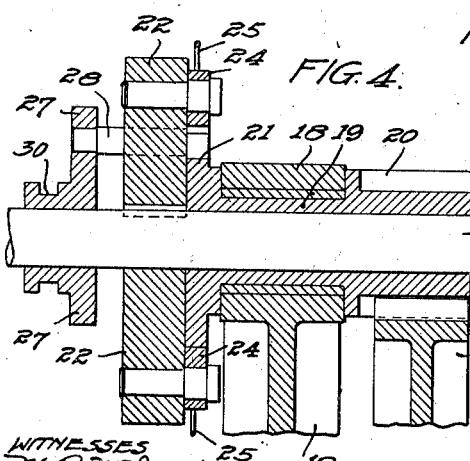
Figure 5:
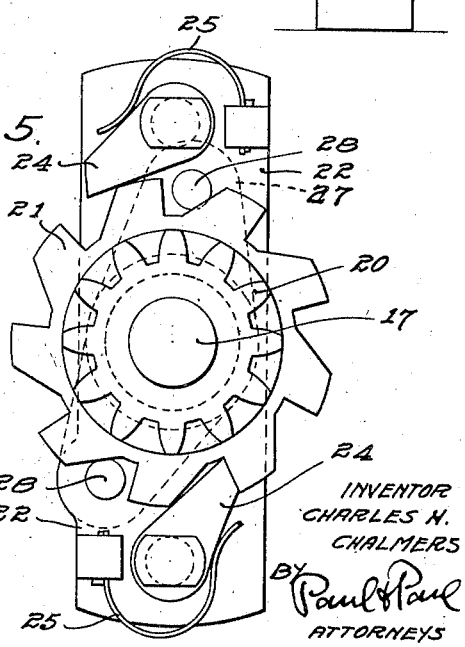

In the accompanying drawings forming part of this specification,

Figure 1 is a side elevation of a tractor embodying my invention, the tongue or pole providing the animal attaching means being shown broken away, Fig. 2 is a plan view of the structure shown in Fig. 1, Fig. 3 is a rear end elevation, Figs. 4 and 5 are details of the ratchet mechanism, between the main drive shaft and the traction wheels.

In the drawings, 2 represents the frame of the machine, which is preferably constructed in the form of an open platform, and which is supported upon a transverse axle 3 upon which are journaled suitable traction wheels 4, 4. The frame 2 is also provided with a forwardly projecting pole or tongue 5 by means of which a team of horses, mules or other animals, may be hitched to the tractor, so as to travel in front thereof. I have shown the pole 5 broken away, and provided at the forward end with a suitable clevis 6. I deem it unnecessary to show the details of the devices by which the team may be hitched to the machine.

Mounted upon the tractor frame, preferably near the forward end thereof, is a suitable internal combustion engine or motor 7. As here shown this motor is provided with a pair of horizontal, opposed cylinders, and while I prefer to employ this type of engine, I do not wish to limit myself thereto, as any suitable motor may be used.

This motor is preferably provided with the usual fly wheel 8, and with a belt pulley 9. A belt 10 extends around the pulley 9 and around a pulley 11 (see Fig. 1) arranged upon a countershaft 14, mounted in bearings 34 upon the platform 2. The countershaft 14 is provided with a pinion 15 and this pinion engages a large gear wheel 16 splined upon a shaft 17. The shaft 17 extends across the platform of the machine and is mounted in sleeves 19 arranged in standards 18 secured to the machine platform near each edge thereof and consequently near the ends of the shaft 17. Each of the sleeves 19 has secured to, or formed integrally with, its outer end a pinion 20 and to its inner end a ratchet wheel 21. The pinions 20 and ratchet wheels 21 are arranged upon opposite sides of the standards 18, and thereby the sleeves 19 are held against endwise movement. The shaft 17, as will be seen, passses through the ratchets 21, the sleeves 19 and the pinions 20. Splined upon the shaft 17 near each end thereof is a head 22 which carries the pivoted pawls 24. Suitable springs 25 are preferably mounted upon the heads 22 and tend to hold the pawls yieldingly against the peripheries of the ratchet wheels 21. Each of the traction wheels 4 is provided with a large gear 26 and these gears are engaged by the pinions 20. Mounted on the shaft 17 are the disks 27, each provided with pins 28 that extend through holes in the corresponding head 22, and are adapted to be projected into the spaces between the teeth of the ratchet wheel 21. Each of these disks 27 is provided with a grooved collar 30 and a pivoted lever 31 is mounted upon the frame of the machine and is provided with a lug engaging the corresponding grooved collar 30. When the disks 27 are in the position shown in Fig. 4 the pins 28 are retracted and do not engage with the teeth of the ratchet wheel 21. By moving the disks 27 toward the heads 22, which may be done by means of the levers 31, the pins 28 are projected through the heads 22 and into engagement with the teeth of the ratchets 21, thereby locking said ratchets to said heads and consequently to the shaft 17. This action necessarily also locks the sleeves 19 and gears 20 to the shaft 17.

A suitable driver's seat 32 may be provided upon the frame of the machine, and this frame may also be provided with a suitable draw-bar frame 33 to which a plow beam or the tongue or pole of any implement that is to be moved by the tractor may be connected.

Operation.

When it is desired to start the motor after the team has been hitched to the machine, the ratchets 21 are locked to the heads 22 by projecting the pins 28 into the spaces between the ratchet teeth. By then starting up the team and causing it to pull or move forward the tractor, the motor pulley 9 and the motor crank shaft 39 will be rotated from the traction wheels 4 through the gears 26, the pinions 20, the shaft 17, the gear 16, the pinion 15, pulley 11 and belt 10. A few turns of the pulley 9 will start the motor, and thereafter the machine will be driven by power applied from the motor to the traction wheels through the instrumentalities mentioned. Having started the motor the operator may then move the levers 31 so as to disengage the pins 28 from the ratchets 21, and the power of the motor will be applied to the ratchet wheels, the pinions 20, and the wheels 4, through the pawls 24, that are carried around with the heads 22 and the shaft 17. The motor is so geared that the tractor will be moved forward at about the ordinary rate of travel of a team of horses or mules. The team hitched to the tractor will guide the same through the pole or tongue, but, in the ordinary operation of the machine, will rarely be called upon to do any pulling. The ratchet connections between the driven shaft 17 and the spur gears on the traction wheels permit the machine to be turned sharply in either direction. It will, therefore, be possible to use the tractor for cultivating corn and doing other farm work. If at any time, owing to soft ground or obstructions, there is an overload upon the machine the team is capable of exerting an immense overload power for a short time until the obstacle is overcome or the machine is moved out of the soft ground. As soon as this is done and the tractor comes onto an ordinary working surface the power of the motor will be sufficient to move the tractor and the team will simply be required to steer it in the right direction and to guide it in making turns. It is not necessary for the operator to crank the motor, as it can always be started by locking the heads 22 to the ratchet wheels and starting the team. The motor can, of course, be started by hand in the usual way.

The ratchet wheels may also be locked by the means described and the motor may then be used to assist the team in moving the tractor backward.

The forward part of the tractor is supported by the team and no wheels or supports for the tractor are required outside of the two tractor wheels.

The machine will be found especially desirable for light farm work. In many instances only a single horse need be employed to guide the tractor. The tractor will be found particularly desirable for operating on a steep side hill. In cultivating corn the culivator shovels may be placed directly under the tractor and supported directly from the tractor frame.

I am aware that animal and engine power have heretofore been used in conjunction, but I am not aware of their conjoint use in a tractor. All previous combinations of this character have had to do with the convenience involved in the number of animals required for the work to be done, and have neither solved nor attempted to solve the problem of getting a footing or getting traction conjointly with large temporary overload capacity for emergencies. These two difficulties did not exist in the previous methods of operating farm implements entirely by animal power. It was only with the advent of a motor-propelled pulling machine that the problem of temporary emergency power on the one hand, or getting traction on the other hand, came into being.

My invention goes to the root of the trouble of using the lightest weight of tractor possible and combining with it means of applying animal power to the extent of taking care of the two weaknesses of gasolene tractors as previously made, to-wit, lack of large emergency power and a method of practicable immediate assistance when the drive wheels slip. The use of animal power for steering the tractor and for emergencies makes possible ideal simplicity of construction which is an important feature of my invention.

This tractor has the advantage of being very inexpensive in construction. It is light in weight and does not pack the ground, and when it tends to slip or bury itself the team will furnish the needed extra power for pulling it on to solid ground. The team will also furnish the power required to pull it over an obstruction.

As the machine operates under substantially full load at all times it can be set with substantially a fixed throttle and spark, and the driver or operator will be able to leave the platform to look after the plows at will.

By releasing the belt or having it loose, the engine will be disconnected from the tractor wheels. When it is desired to move the tractor backward the belt is released, and the team is backed. No reversing gear is required on the tractor. By removing the belt the engine may be used for ordinary power purposes.

A belt tightener pulley 35 is preferably provided mounted upon a bell-crank lever 36. This lever is in position to be operated by a person sitting on the seat 32. The lever may be engaged with the ratchet teeth 37 on the bar 38 and thereby held in any desired position.

The engine crank shaft 39 is preferably provided with a notched end 40, so that a crank may be applied thereto when it is desired to start the engine by hand.

I do not limit myself to the details of the construction as the same may be varied in many particulars without departing from my invention, and while I have shown the machine provided with a pole for the attachment of a team of animals, it will be understood that a pair of thills or shafts may be employed if the machine is to be guided by a single animal.

I claim as my invention:

1. The combination, with a tractor frame, provided with traction wheels, of a motor mounted on said frame, a ratchet connection between said motor and each of said wheels whereby either of said wheels may remain stationary or turn slowly in turning the tractor, means permitting the attachment of a team to said frame to guide the tractor, and applying, at will, animal power thereto to assist the motor in moving the tractor.

2. The combination, with a tractor frame provided with two oppositely arranged traction wheels, of a motor mounted on said frame, ratchet connections between said motor and said wheels, means for attaching a team to said frame to support its forward end to guide the tractor, and to apply at will animal power to assist the motor in moving the tractor, and means for locking said ratchet connections whereby the motor may be driven for starting purposes from said traction wheels.

3. The combination, with a tractor frame, provided with a pair of oppositely arranged traction wheels, of a motor mounted on said frame, ratchet connections between said motor and said traction wheels, whereby both of said wheels may be driven from said motor, and the inside wheel may slow up when the tractor is turned, means for attaching a team to said frame to support its forward end to guide the tractor, and to apply at will animal power to assist the motor in moving the tractor.

In witness whereof, I have hereunto set my hand this 15th day of August 1916.

CHARLES H. CHALMERS.

Copies of this patent may be obtained for five cents each, by addressing the "Commissioner of Patents, Washington, D. C."